United States Patent
Tanabe et al.

(10) Patent No.: US 9,864,226 B2
(45) Date of Patent: *Jan. 9, 2018

(54) LIQUID CRYSTAL DISPLAY DEVICE

(71) Applicant: Japan Display Inc., Tokyo (JP)

(72) Inventors: Shinji Tanabe, Mobara (JP); Setsuo Kobayashi, Mobara (JP); Katsuhiko Ishii, Chosei (JP); Akira Ishii, Mobara (JP); Kiyoshi Sento, Sakura (JP)

(73) Assignee: Japan Display Inc., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 14/979,849

(22) Filed: Dec. 28, 2015

(65) Prior Publication Data

US 2016/0109749 A1 Apr. 21, 2016

Related U.S. Application Data

(63) Continuation of application No. 13/601,196, filed on Aug. 31, 2012, now Pat. No. 9,250,461.

(30) Foreign Application Priority Data

Sep. 29, 2011 (JP) ................................. 2011-213981

(51) Int. Cl.
*G02F 1/1335* (2006.01)
*G02F 1/1333* (2006.01)
(Continued)

(52) U.S. Cl.
CPC ...... *G02F 1/133512* (2013.01); *G02F 1/1339* (2013.01); *G02F 1/1368* (2013.01); *G02F 1/13454* (2013.01); *G02F 1/133308* (2013.01); *G02F 2001/133331* (2013.01); *G02F 2001/133388* (2013.01);
(Continued)

(58) Field of Classification Search
CPC ...................................................... G02F 1/1533
See application file for complete search history.

(56) References Cited

U.S. PATENT DOCUMENTS

2007/0291216 A1* 12/2007 Chan ..................... G02F 1/1339
349/153
2009/0079706 A1 3/2009 Mishima et al.
(Continued)

FOREIGN PATENT DOCUMENTS

JP 2009-192792 8/2009

*Primary Examiner* — Edmond Lau
(74) *Attorney, Agent, or Firm* — Ulmer & Berne LLP

(57) ABSTRACT

In a liquid crystal display device, there is provided a liquid crystal display panel in which a TFT substrate and a counter substrate are bonded together by a sealing material, with a liquid crystal sandwiched between the substrates. Further, a front window with a black border print formed in the periphery is bonded to the liquid crystal display panel by a UV curable resin. The liquid crystal is filled by a drop method. The thickness of the TFT substrate and the counter substrate is reduced to about 0.2 mm by polishing. An inner end of the black border print of the front window is inside an inner end of the sealing material, to prevent the counter substrate of the liquid crystal display panel from being deformed by stress generated in the curing of the UV curable resin, thereby preventing yellow discoloration in the periphery of the display area.

8 Claims, 6 Drawing Sheets

(51) Int. Cl.
  *G02F 1/1339* (2006.01)
  *G02F 1/1345* (2006.01)
  *G02F 1/1368* (2006.01)

(52) U.S. Cl.
  CPC ............ *G02F 2001/133562* (2013.01); *G02F 2201/54* (2013.01); *G02F 2202/023* (2013.01); *G02F 2202/28* (2013.01)

(56) References Cited

U.S. PATENT DOCUMENTS

| | | | |
|---|---|---|---|
| 2009/0190071 A1* | 7/2009 | Kubota | G02F 1/133512 349/96 |
| 2009/0257010 A1* | 10/2009 | Sakurai | G02F 1/133308 349/110 |
| 2010/0245705 A1* | 9/2010 | Nakagawa | G02F 1/133308 349/58 |
| 2011/0187960 A1 | 8/2011 | Kobayashi et al. | |
| 2011/0205472 A1* | 8/2011 | Kobayashi | B32B 17/06 349/104 |

\* cited by examiner

Prior Art

Prior Art

A PORTION

B PORTION

C PORTION

Prior Art

REDUCED PRESSURE ATMOSPHERE

REDUCED PRESSURE ATMOSPHERE

ATMOSPHERIC PRESSURE

Prior Art

Prior Art

LIQUID CRYSTAL DISPLAY DEVICE

CLAIM OF PRIORITY

The present application is a continuation of U.S. patent application Ser. No. 13/601,196, filed on Aug. 31, 2012, which claims priority from Japanese Patent Application JP 2011-213981 filed on Sep. 29, 2011. The entire disclosures of each of these applications are hereby incorporated herein by reference.

FIELD OF THE INVENTION

The present invention relates to a liquid crystal display device, and more particularly to a small display device including a front window.

BACKGROUND OF THE INVENTION

In a liquid crystal display device, there is provided a TFT substrate in which pixel electrodes, thin film transistors (TFT) and the like are arranged in a matrix form. Further, a counter substrate is disposed opposite to the TFT substrate. In the counter substrate, color filters and the like are formed at locations corresponding to the pixel electrodes of the TFT substrate. Then, a liquid crystal is sandwiched between the TFT substrate and the counter substrate. Thus, the liquid crystal display device forms an image by controlling the transmittance of light of the liquid crystal molecules for each pixel.

Regarding the liquid crystal display device, there is a strong demand for reducing the overall size of the set itself and reducing the thickness of the liquid crystal display panel, with the size of the screen being fixed. In order to reduce the thickness of the liquid crystal display panel, the liquid crystal display panel is formed and thinned by polishing the outside.

The TFT substrate including pixel electrodes, TFT and the like, and the counter substrate including color filters, are glass substrates constituting the liquid crystal display device. The two glass substrates are standardized, for example, at a thickness of 0.5 mm or 0.7 mm. It is difficult to obtain glass substrates, other than such standardized substrates, from the market. In addition, very thin glass substrates have a problem in the production process in terms of mechanical strength and bending or deformation, which reduces the production yield. For this reason, the liquid crystal display panel is formed by the standardized glass substrates and is thinned by polishing the external surface of the liquid crystal display panel.

When the thickness of the liquid crystal display device is reduced, there is a problem of mechanical strength. If mechanical stress is applied to the display surface of the liquid crystal display panel, the liquid crystal display panel may be destroyed. In order to prevent this, a front window is attached to the side of the screen of the liquid crystal display panel when the liquid crystal display panel is mounted to a cellular phone set and the like.

In general, the front window is attached to the liquid crystal display panel with a UV curable resin. In order to improve design quality and image quality, as well as other improvements, a black border is printed around the front window. Ultraviolet light does not easily pass through the portion of the black border print, so that non-uniformity occurs in the UV curable resin.

Japanese Unexamined Publication No. 2009-192792 describes a method of curing the UV curable resin under the black border print by using the gradient the black border print, in order to eliminate the non-uniformity in the degree of curing of the UV curable resin. In other words, in Japanese Unexamined Publication No. 2009-192792, the area of the black border print is divided into two parts: one is the inner part where the color is light, and the other is the outer part where the color is deep. With this configuration, it is possible to prevent the stress in the curing of the resin.

SUMMARY OF THE INVENTION

However, in the technology described in Japanese Unexamined Publication No. 2009-192792, it is found that the stress generated on the glass substrate is not necessarily reduced and may increase the difference in the degree of curing of the UV curable resin. Further, the black border print is formed to increase the display quality level. However, there is also a problem that the screen is dims down when the blackening degree in the inner part of the black border print is low.

It is desirable that in a liquid crystal display device including a liquid crystal display panel to which a front window with a black border print is attached, yellow discoloration or other damage is prevented from occurring in the periphery of the display area of the liquid crystal display panel, by reducing the deformation due to the stress generated particularly on a counter substrate when an adhesive is cured onto the liquid crystal display panel.

The present invention is to solve the above problem. An example of one aspect of the present invention is as follows. There is provided a liquid crystal display device including a liquid crystal display panel to which a front window is attached. The liquid crystal display panel includes a TFT substrate in which pixels each having a pixel electrode and a TFT are formed, and a counter substrate in which color filters are formed. The TFT substrate and the counter substrate are bonded together by a sealing material. A liquid crystal is filled between the TFT substrate and the counter substrate. A lower polarization plate is attached to the side of the TFT substrate. Then, an upper polarization plate is attached to the side of the counter substrate. A black border is printed around the front window. The side of the front window in which the black border is printed is bonded to the upper polarization plate of the liquid crystal display panel by a UV curable resin. An inner end portion of the sealing material is formed in an inside of the inner end portion of the black border print of the front window.

In the liquid crystal display panel described above, preferably the inner end portion of the sealing material is 0.2 mm or more inside from the inner end portion of the black border print of the front window.

According to the present invention, it is possible to prevent the deformation of the counter substrate due to the curing shrinkage of the UV curable resin, in the liquid crystal display device in which the liquid crystal display panel and the front window are bonded together by the UV curable resin. Thus, it is possible to prevent yellow discoloration from occurring in the periphery of the display area.

DETAILED DESCRIPTION OF THE PREFERRED EMBODIMENTS

Figure 4:
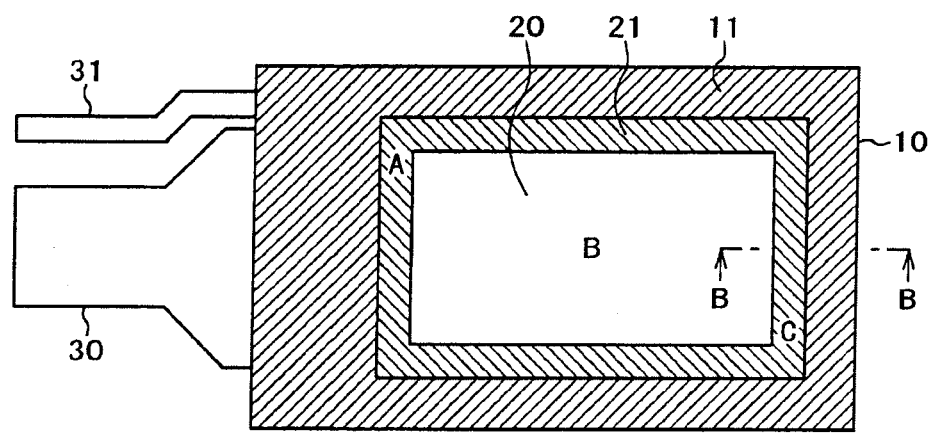
FIG. 4 is a schematic plan view of yellow discoloration in the periphery of the display area in the liquid crystal display device.

Before the description of embodiments of the present invention, the problem occurred in the liquid crystal display device to which the present invention is applied will be described. FIG. 4 is a plane view of a liquid crystal display device used for cellular phones or other electronic devices. In FIG. 4, a front window 10 is provided on the surface. A black border print 11 is formed in the periphery of the front window 10. The inside of the black border print is a display area 20. In FIG. 4, a liquid crystal display panel provided below the front window 10 is smaller than the front window 10, so that the liquid crystal display panel does not appear in FIG. 4. Then, a flexible wiring substrate 30 connected to the liquid crystal display panel as well as a backlight flexible wiring substrate 31 extend on the left side of FIG. 4.

In FIG. 4, a yellow discolored area 21 is present around the display area 20, namely, in the inner part of the black border print 11. As described later, the yellow discolored area 21 is generated by the fact that the gap between the TFT substrate 100 and the counter substrate 200 increases in the liquid crystal display panel.

Figure 5:
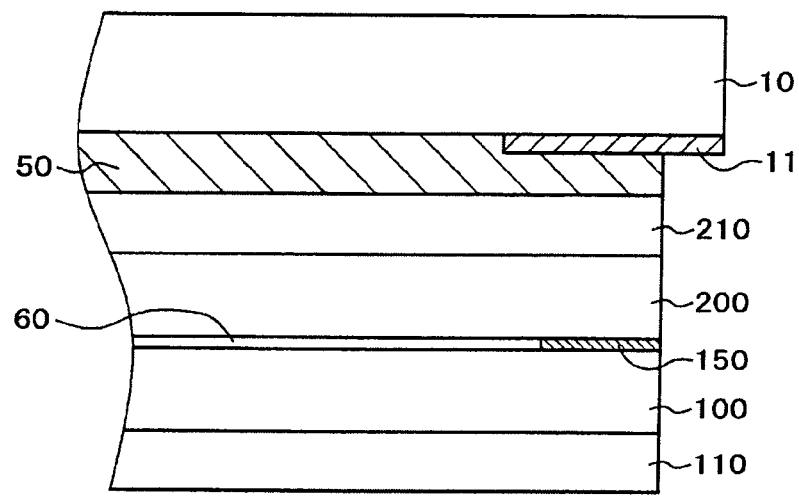
FIG. 5 is a cross-sectional view showing the position of a black border print in the front window as well as the position of a sealing material in the liquid crystal display panel in the related art.

FIG. 5 is a cross-sectional view taken along line B-B of FIG. 4. In FIG. 5, a liquid crystal layer 60 is sandwiched between the TFT substrate 100 and the counter substrate 200. The liquid crystal layer 60 is sealed by a sealing material 150 formed in the periphery of the TFT substrate 100 and the counter substrate 200. The width of the sealing material 150 is about 0.8 mm. A lower polarization plate 110 is attached to the lower side of the TFT substrate 100. Then, an upper polarization plate 210 is attached to the upper side of the counter substrate 200.

The front window 10 is bonded to the upper polarization plate 210 through an adhesive 50. The black border print 11 is formed in the lower periphery of the front window 10. The width of the black border print 11 in the short side where the flexible wiring substrate is not connected is about 10 mm. The adhesive 50 is a UV curable resin. The UV curable resin is initially a liquid that contains, for example, 27% to 30% acrylic oligomer. It is also possible to use acrylic resin containing UV reactive monomer or additive agent for photopolymerization and the like. In this case, the thickness of the adhesion can be about several μm to 30 μm.

During curing of the UV curable resin 50, curing shrinkage occurs. The curing shrinkage of the adhesive 50 occurs in the direction shown in the arrow of FIG. 6. Thus, the thickness of the adhesive 50 in the periphery is smaller than in the center. For example, FIGS. 7A, 7B, and 7C show the film thickness of the adhesive in positions A, B, and C in FIG. 4. In FIG. 7, an adhesive thickness tA in the position A in the periphery is 53 μm, an adhesive thickness tB in the position B in the center is 72 μm, and an adhesive thickness tC in the position C in the periphery is 54 μm. Because the thickness of the adhesive differs in this way, stress occurs particularly on the counter substrate 200 of the liquid crystal display panel. As a result, deformation occurs in the counter substrate 200 as shown in FIG. 6.

Figure 6:
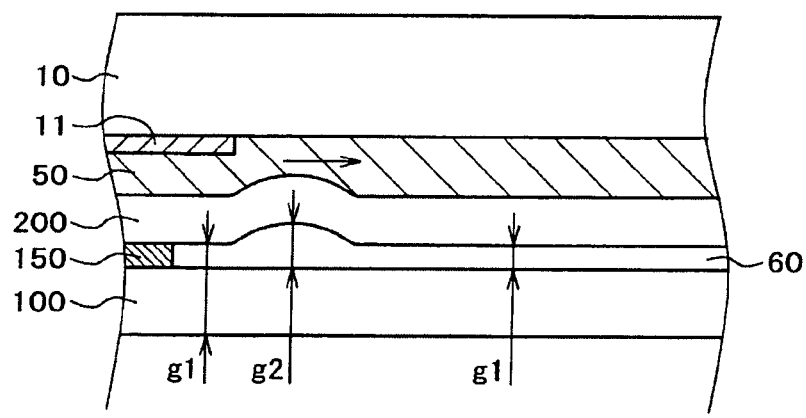
FIG. 6 is a schematic cross-sectional view of the state in which the counter substrate of the liquid crystal display panel is deformed by the UV curable resin.
Figure 7:
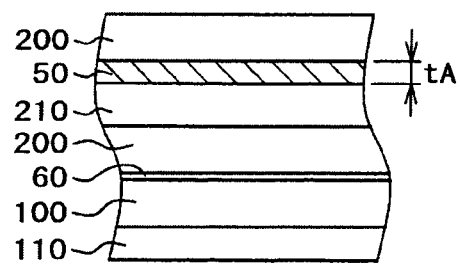
FIG. 7 is cross-sectional views showing that the thickness of the UV curable resin is different depending on the location.
Figure 7:
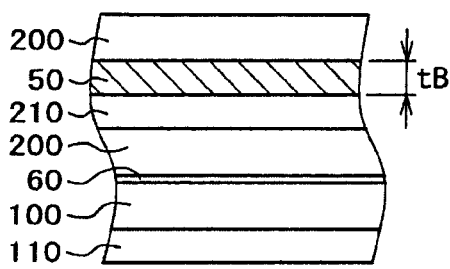
Figure 7:
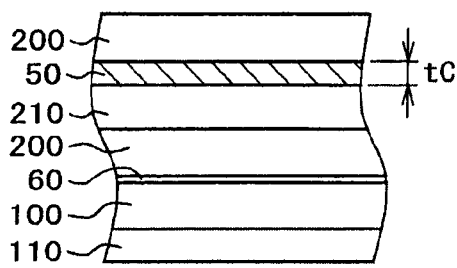

FIG. 6 is a schematic view of the influence of the curing shrinkage of the UV curable resin 50. FIG. 6 is a schematic view, so that the upper polarization plate 210 and the lower polarization plate 110 are omitted. However, the influence of the curing shrinkage of the UV curable resin 50, which will be described below, reaches the counter substrate 200 of the liquid crystal display panel through the upper polarization panel 210. In FIG. 6, the arrows indicate the direction of the curing shrinkage of the UV curable resin 50. Thus, the thickness of the adhesive 50 in the center is greater than in the periphery.

The counter substrate 200 of the liquid crystal display panel is deformed as shown in FIG. 6 by the stress due to the difference in the thickness of the adhesive 50. As a result, the gap between the counter substrate 200 and the TFT substrate 100 increases in the area where the counter substrate 200 is deformed. For example, the gap between the counter substrate 200 and the TFT substrate 100 is 4 μm, but is 4.4 μm in the area where the gap increases due to the deformation of the counter substrate 200. This is the cause of the yellow discolored area 21 in the periphery of the substrate shown in FIG. 4. Note that the deformation of the counter substrate 200 occurs not only by the difference in the thickness of the adhesive 50 but also the difference in the degree of curing by ultraviolet light passing through the black border print 11 on the front window 10.

Figure 8A:
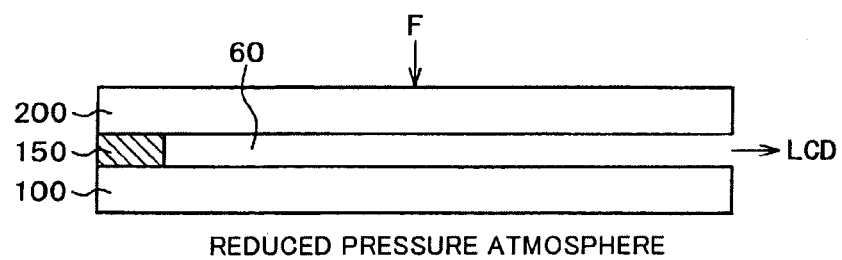
FIGS. 8A, 8B, and 8C are views of the process of filling liquid crystal by vacuum suction.
Figure 8B:
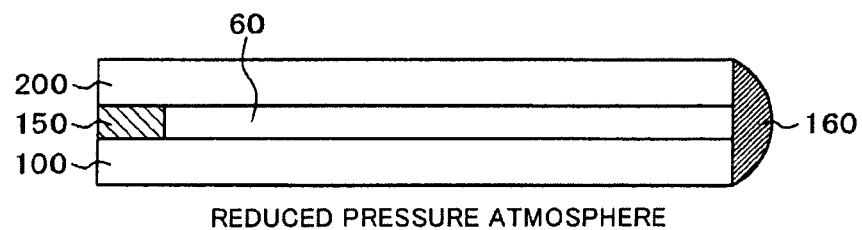
Figure 8C:
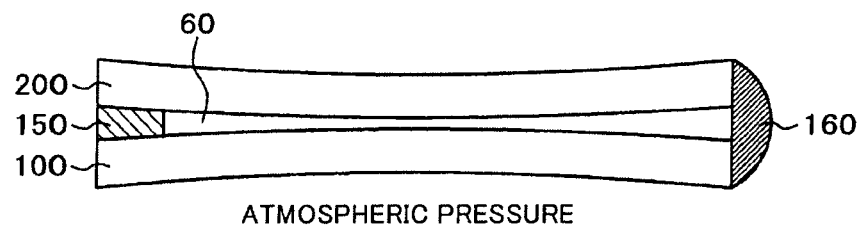

The deformation of the counter substrate 200 shown in FIG. 6 is not likely to occur in the liquid crystal display panel formed by vacuum filling of liquid crystal shown in FIGS. 8A, 8B, and 8C. In the vacuum filling of liquid crystal shown in FIGS. 8A, 8B, and 8C, liquid crystal is filled into the liquid crystal display panel. Then, a portion of the liquid crystal is taken out to the outside by a force F from the outside, so that the gap between the flat TFT substrate and the flat counter substrate is completely filled with the liquid crystal. Then, as shown in FIG. 8B, the inlet of a liquid crystal 60 is sealed by a sealing material 160. FIGS. 8A and 8B are performed in a reduced pressure atmosphere. After that, when the liquid crystal display panel is placed in the atmosphere, the TFT substrate 100 and the counter substrate 200 bend to the inside due to the atmospheric pressure as shown in FIG. 8C. Because the TFT substrate 100 and the counter substrate 200 bend to the inside, the deformation shown in FIG. 6 is not likely to occur.

As an example of the filling method of the liquid crystal 60, there is One Drop Fill (ODF) method. One Drop Fill (ODF) is the method for precisely controlling the amount of liquid crystal 70, dropping the liquid crystal 70 into the counter substrate 200 in which the sealing material 150 is formed, and bonding the TFT substrate 100 and the counter substrate 200 to each other. The filling speed of the liquid crystal is faster in ODF than in the vacuum filling method. However, the TFT substrate 100 or the counter substrate 200 does not bend to the inside and is flat as shown in FIG. 9B. For this reason, the counter substrate 200 is likely to be deformed as shown in FIG. 6.

First Embodiment

Figure 1:
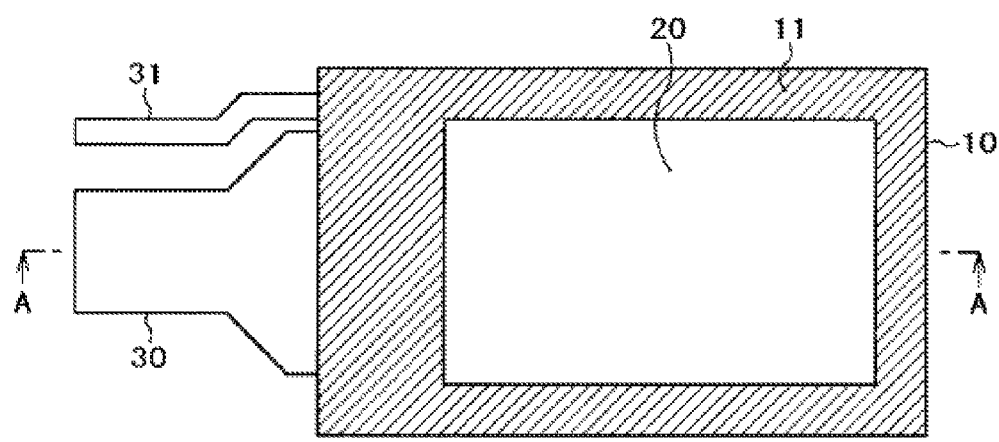
FIG. 1 is a plan view of a liquid crystal display device to which the present invention is applied.
Figure 9A:
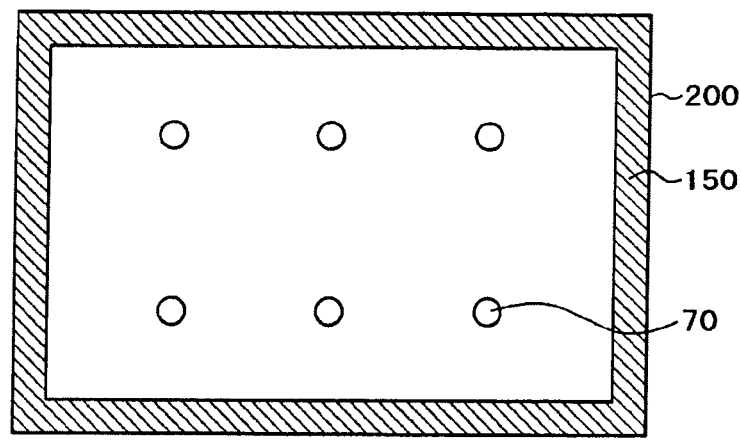
FIGS. 9A and 9B are views of the process of filling liquid crystal by a drop method.
Figure 9B:
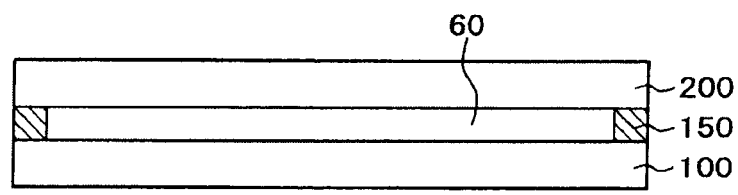

The present invention is particularly effective with respect to a liquid crystal display panel in which a liquid crystal 70 is filled by the ODF process shown in FIG. 9. FIG. 1 is a plan view of a small liquid crystal display device such as a cellular phone to which the present invention is applied. FIG. 1 is the same as FIG. 4 except the yellow discolored area does not occur in the periphery of a display area 20, and the description thereof will be omitted.

Figure 2:
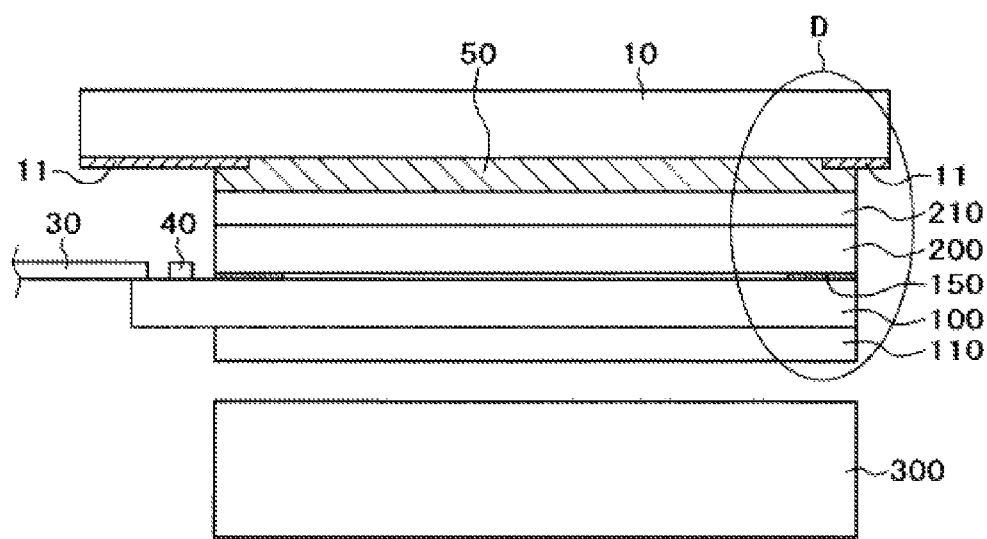
FIG. 2 is a cross-sectional view taken along line A-A of FIG. 1.

FIG. 2 is a cross-sectional view taken along line A-A of FIG. 1. In FIG. 2, it is shown a liquid crystal display panel in which a front window 10 is attached on a backlight 300. In the backlight 300, an LED which is a light source, a light guide panel, a reflective sheet, a diffusion sheet, a prism sheet and the like are placed, for example, in a resin mold. The liquid crystal display panel is placed on the resin mold.

In FIG. 2, the liquid crystal display panel includes a TFT substrate 100, a counter substrate 200, a lower polarization plate 110, and an upper polarization plate 210. A liquid crystal layer is sandwiched between the TFT substrate 100 and the counter substrate 200. The liquid crystal layer is sealed by a sealing material 150. The sealing material is seamlessly formed in the entire circumference at a width of 0.8 mm. The thickness of the TFT substrate 100 and the counter substrate 200 is reduced from 0.5 mm to about 0.2 mm by polishing.

The liquid crystal is filled by the ODF process. In this case, the sealing material 150 is formed on the counter substrate 200, and the liquid crystal is dropped into the counter substrate 200 by the drop method. Then, the counter substrate 200 is bonded to the TFT substrate 100. The TFT substrate 100 is made larger than the counter substrate 200. An IC driver 40 and a flexible wiring substrate 30 are connected to the end portion of the TFT substrate 100 where the counter substrate does not overlap the TFT substrate 100.

A front window 10 is bonded to the upper polarization plate 210 attached to the counter substrate 200, by an adhesive 50 of UV curable resin. A black border print 11 is formed in the periphery of the front window 10. The width of the black border print is in the range of 0.5 mm to 10 mm. The feature of the present invention is that the inner end portion of the black border print 11 is inside the inner end portion of the sealing material 150 of the liquid crystal display panel.

Figure 3:
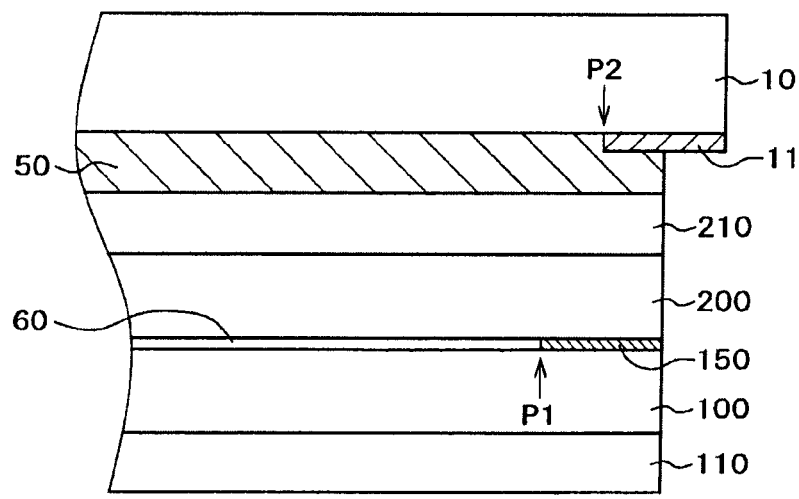
FIG. 3 is an enlarged view of a D portion in FIG. 2.

FIG. 3 is an enlarged view of a D portion in FIG. 2. In FIG. 3, the front window 10 is attached to the liquid crystal display panel by the adhesive 50. The liquid crystal display panel includes the TFT substrate 100, the counter substrate 200, the liquid crystal layer 60 sandwiched between the TFT substrate 100 and the counter substrate 200, the sealing material 150 surrounding the liquid crystal display layer, the lower polarization plate 110 attached to the TFT substrate 100, and the upper polarization plate 210 attached to the counter substrate 200.

In FIG. 3, the TFT substrate 100 and the counter substrate 200 are formed from glass. The thickness of each of the glass substrates is reduced to about 0.2 mm by polishing the outside. The thickness of both the upper polarization plate 210 and the lower polarization plate 110 is 0.13 mm. The total thickness of the counter substrate 200 and the polarization plate 210, which is attached to the counter substrate 200, is 0.66 mm. Thus, the counter substrate 200 is easily deformed by an external force.

The black border print 11 is formed in the lower periphery of the front window 10. The liquid crystal display panel and the front window 10 are bonded together by the UV curable resin 50. When the UV curable resin 50 is irradiated by ultraviolet light, curing shrinkage occurs. As a result, the film thickness of the adhesive 50 is reduced in the periphery of the liquid crystal display panel, and stress occurs in the counter substrate 200 of the liquid crystal display panel.

As the thickness of the counter substrate 200 is about 0.2 mm, so that the counter substrate 200 is easily deformed when the stress is applied. As a result, the gap between the TFT substrate 100 and the counter substrate 200 is changed as described with reference to FIG. 6. The stress due to the curing shrinkage of the adhesive 50 is likely to occur particularly in the vicinity of the end of the black border print 11 of the front window 10. When the deformation of the counter substrate 200 occurs on the lower side of the black border print 11, discoloration can be prevented when color and the like is changed. However, when the deformation of the counter substrate 200 occurs inside the end of the black border print 11, yellow or other screen discoloration is visible.

In the present invention, an inner end portion P1 of the sealing material 150 is located inside an inner end portion P2 of the black border print 11 of the front window 10. Preferably, the inner end portion P1 of the sealing material 150 is 0.2 mm or more inside from the inner end portion P2 of the black border print 11 of the front window 10. Further, in FIG. 2, the inner end portion P2 of the black border print 11 is present within the seal width in the thickness direction of the panel. In other words, the black border print 11 and the sealing material 150 are located so that the two regions partially overlap when viewed from the side of the front window.

In FIG. 3, the sealing material 150 is an epoxy resin with a thickness of several µm, and has a very strong adhesive force. The TFT substrate 100 and the counter substrate 200 are tightly bonded by the sealing material 150 with very strong adhesive properties, so that the strength is equal to that of twice the layer thickness. As a result, the deformation with respect to the stress is reduced to one eighth.

As described above, according to the present invention, the sealing material 150 for bonding the TFT substrate 100 and the counter substrate 200 is formed at the location where the stress is the maximum, so that the counter substrate 200 is not likely to be deformed. Thus, the gap between the TFT substrate 100 and the counter substrate 200 can be kept constant.

What is claimed is:
1. A liquid crystal display device comprising:
a front window;
a liquid crystal display panel attached to the display panel comprising
a TFT substrate,
a counter substrate,
a liquid crystal disposed between the TFT substrate and the counter substrate,
a sealing material disposed between the TFT substrate and the counter substrate and sealing the liquid crystal,
a black border formed in the periphery of the front window,
a driver disposed on the TFT substrate and
a resin adhering to the front window;
wherein, in a plan view, a center of the display area is closer to an inner end portion of the sealing material than to an inner end portion of the black border;
wherein the resin overlaps with the sealing material and the black border in a plan view and
wherein, in a plan view, the black border is disposed above the driver.

2. The liquid crystal display device of claim 1,
wherein the resin is thicker or as thick as the sealing material.

3. The liquid crystal display device of claim 1 wherein, in the region which is inside of the inner end portion of the black border in a plan view, the thickness of the resin in a center portion is thinner than the thickness of the resin in outside of the center portion.

4. The liquid crystal display device of claim 1,
wherein the black border has four sides, and the side which overlaps the driver is the widest in a plan view.

5. The liquid crystal display device of claim 1 comprising:
a lower polarization plate attached to the TFT substrate; and
an upper polarization plate attached to the counter substrate;
wherein the front window is bonded to the upper polarization plate by a resin.

6. The liquid crystal display device of claim 1 comprising:
a first flexible wiring substrate on the TFT substrate,
wherein, in a plan view, the black border is disposed above the first flexible wiring substrate.

7. The liquid crystal display device of claim 6 comprising:
a second flexible wiring substrate on the TFT substrate adjacent to the first flexible wiring substrate,
wherein, in a plan view, the black border is disposed above the second flexible wiring substrate.

8. The liquid crystal display device of claim 1,
wherein an outer end portion of the sealing material overlaps with the resin and the black border in a plan view.

* * * * *

UNITED STATES PATENT AND TRADEMARK OFFICE
CERTIFICATE OF CORRECTION

PATENT NO. : 9,864,226 B2
APPLICATION NO. : 14/979849
DATED : January 9, 2018
INVENTOR(S) : Shinji Tanabe et al.

Page 1 of 1

It is certified that error appears in the above-identified patent and that said Letters Patent is hereby corrected as shown below:

In the Claims

Column 6, Lines 48-49, Claim 1, change "a liquid crystal display panel attached to the display panel comprising" to --a liquid crystal display panel attached to the front window and comprising--.

Signed and Sealed this
Tenth Day of April, 2018

Andrei Iancu
*Director of the United States Patent and Trademark Office*